June 2, 1964 R. M. SWANSON 3,135,945

INFORMATION CHECKING SYSTEM UTILIZING ODD AND EVEN DIGIT CHECKS

Filed Dec. 20, 1961 3 Sheets-Sheet 1

INVENTOR
R. M. SWANSON
BY
R. C. Winter
ATTORNEY

INFORMATION CHECKING SYSTEM UTILIZING ODD AND EVEN DIGIT CHECKS

Filed Dec. 20, 1961 3 Sheets-Sheet 2

INVENTOR
R. M. SWANSON
BY
R. C. Winter
ATTORNEY

INFORMATION CHECKING SYSTEM UTILIZING ODD AND EVEN DIGIT CHECKS

Filed Dec. 20, 1961 3 Sheets-Sheet 3

INVENTOR
R. M. SWANSON
BY
R. C. Winter
ATTORNEY 3,135,945

INFORMATION CHECKING SYSTEM UTILIZING ODD AND EVEN DIGIT CHECKS

Richard M. Swanson, Holmdel Township, Monmouth County, N.J., assignor to Bell Telephone Laboratories, Incorporated, New York, N.Y., a corporation of New York Filed Dec. 20, 1961, Ser. No. 160,727
8 Claims. (Cl. 340—146.1)

This invention relates generally to information checking systems and particularly to equipment utilizing relay devices for checking the relationship of elements in code characters representing information and for detecting transpositions of elements in such characters.

A code is a system of characters having an ordered sequence of elements representing information. For example, a code may consist of a system of three digit numbers and, accordingly, each three digit number corresponds to a character and each digit of the number corresponds to an element of a character.

Often, it is desirable to utilize equipment in communications systems, computers and other automatic machines for checking the validity of each information character as it is received and processed to insure that it is free from transpositional errors and that reliable results are obtained from the machine operations. The need for such equipment in automatic machines generally depends on the consequences of improper operation caused by transpositional errors. In many instances, the equipment must be used to avoid situations in which such errors can cause extensive economic loss.

The prior art offers various types of equipment and methods for checking the validity of coded information and for detecting transpositional errors. For example, U.S. Patent Application 79,886 of W. B. Macurdy filed on December 30, 1960 discloses electronic equipment for checking the odd and even order digits of plural order numbers against a rule which requires that the valid numbers of a code have digits of the odd order of a magnitude greater than the adjacent even order digits. For instance, in accordance with this rule, the number 435 is a valid number. However, if the first odd order digit 4 and the even order digit 3 are transposed the resultant number 345 is invalid.

The equipment disclosed in the Macurdy application sequentially receives each digit of a number in decimal form from a source; translates it into a multibit binary code having a most significant bit, intermediate significant bits and a least significant bit for each digit; and then transfers the binary bits to register circuits for storage. Each of these bits or binary digits is a single symbol of a language employing exactly two distinct kinds of symbols, such as 0 and 1, and is represented, for example, by ground or negative potential. Four of these symbols are used in distinct combinations for representing each decimal digit.

A comparator circuit is provided in the equipment for comparing the stored bits to ascertain whether the digits satisfy the rule. The comparison is made by comparing sequentially the stored most significant bits, intermediate bits and least significant bits until an answer is obtained regarding the validity of the stored digits. Circuitry is also provided for passing the binary encoded digits to a utilization circuit only if the digits satisfy the rule. When a transposed or invalid digit is detected by the comparator, it notifies the number source and the utilization circuit of same and then prepares the equipment for checking the digits of another number.

Although such equipments are technically reliable, it is not economically feasible in many instances to use them in automatic machines because their cost is too high. A principal reason for the high cost is that a large quantity of complex and expensive apparatus is required to check the control information.

In view of the foregoing, an object of my invention is to provide inexpensive equipment for checking the relationship of elements of coded information characters and for detecting transpositions of elements in such characters.

In accordance with my invention, simple and inexpensive relay circuits are provided for checking the relationship of elements in coded characters. An exemplary embodiment of the invention is arranged to check the validity of digits in plural order numbers and to detect transpositional errors, such as, the interchange of adjacent digits, the addition of an invalid digit or the deletion of a valid digit in such numbers. For this embodiment, the valid numbers are encoded according to the rule set forth in the aforementioned Macurdy application which requires that the magnitude of the digits of the even order shall not be greater than the magnitude of the adjacent digits of the odd order.

The equipment in the exemplary embodiment employs a sequence control circuit for directing each odd and even order digit from a number source to odd and even digit register relays for storage. Contacts of these relays are arranged in two comparator circuits for checking the stored digits against the encoding rule. One of these comparators checks each even order digit against the rule by comparing its magnitude with the magnitude of the immediately preceding odd order digit. The other comparator checks each odd order digit by comparing its magnitude with the magnitude of the immediately preceding even order digit. For example, in the number 435, the first mentioned comparator checks the digit 3 with the digit 4; the second comparator checks digit 5 with digit 3. When the check indicates that a digit satisfies the rule, the checking circuit permits that digit to be transmitted to the utilization circuit. However, if a digit fails to satisfy the rule, the comparator prevents the transmission of that digit to the utilization circuit and activates an alarm circuit. The latter then informs the number source and the utilization circuit that an invalid or transposed digit has been detected and thereafter resets the checking equipment to prepare it for checking the digits of another number.

An advantage of my invention is that it is unnecessary to provide circuitry either for translating digits into a multibit binary code before they are checked or for sequentially checking binary digits or bits to determine the validity of the digits.

A feature of my invention is that the validity of coded information characters be checked by equipment which utilizes relays for registering elements of the characters to be checked and comparator facilities controlled by these relays for comparing the registered elements.

Another feature is that the equipment includes a sequence circuit comprising relays for directing the odd and even order elements of a character to the appropriate register relays as they are sequentially received from a source.

It is another feature that the comparator facilities include a relay circuit having contacts of the register relays for comparing each odd order element with the immediately preceding even order element.

Another feature is that the comparator facilities further include a relay circuit having contacts of the register relays for comparing each even order element with the immediately preceding odd order element.

A further feature is that the comparator relay circuits include contacts of the directing relays for sequentially activating the relay circuits.

Another feature is that the equipment includes gate circuits comprising contacts of the register relays and the comparator relays for indicating the validity of compared elements.

Yet another feature is that the equipment comprises an alarm circuit having a relay controlled by contacts of the comparator relays for indicating a transposed element in a checked character.

The foregoing objects, advantages and features of this invention, together with others, may be more fully understood by reading the following description of an exemplary embodiment thereof as shown in the drawing, in which.

The schematic diagrams employ a type of notation referred to as "detached contact" in which an "*x*" represents a normally open contact of a relay and a vertical bar represents a normally closed contact of a relay; normally referring to the unoperated condition of a relay. The principles of this type of notation are described in an article entitled "An Improved Detached Contact Type of Circuit Drawing" by F. T. Meyer in the September 1955 publication of the American Institute of Electrical Engineers Transactions, Communications and Electronics, Volume 74, pages 505–513.

GENERAL DESCRIPTION

Figure 1:
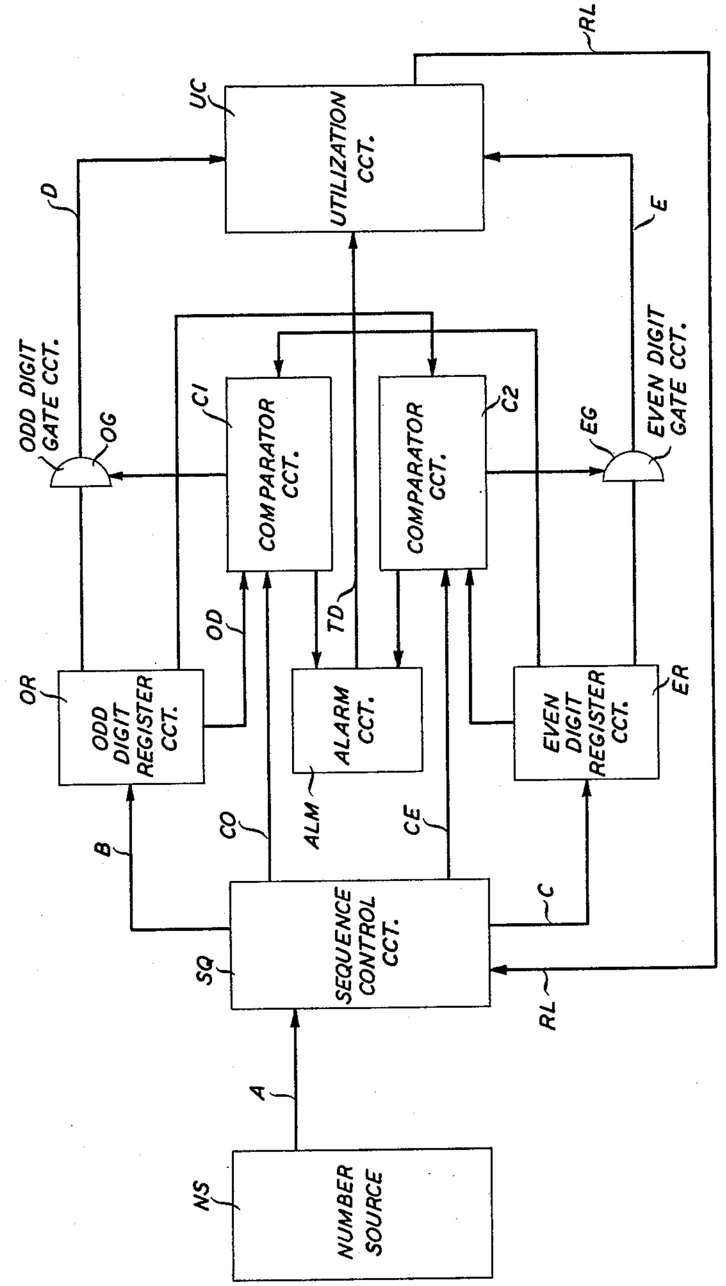
FIG. 1 is a block diagram showing the interrelation of the component elements of the exemplary embodiment.

The exemplary embodiment provides for the transmission of only valid digits of a plural digit number from a number source to a utilization circuit. The validity of each of the digits of a number is defined by the rule that digits of the odd order shall not be less than those adjacent digits of the even order. In FIG. 1, a number source NS is connected to a sequence control circuit SQ of the checking equipment by a cable A. Source NS includes switching gear, battery supplies, etc. as known in the art for producing electrical signals representing odd and even digits of plural order numbers and for applying these signals to cable A. The checking equipment includes the following circuits: sequential control SQ, odd and even digit registers OR and ER, comparators C1 and C2, odd and even digit gates OG and EG, and alarm ALM.

The interrelation of the aforementioned circuits and their functional operations involved in transmitting valid digits from the source NS to the utilization circuit UC and for preventing the transmission of invalid digits therebetween will now be described with reference to FIG. 1. Source NS is arranged to transmit multidigit numbers to the sequence circuit SQ. The first, third, fifth . . . digits of these numbers are the odd order digits and the second, fourth, sixth . . . digits of these numbers are the even order digits. The digits of a number are transmitted sequentially from a source NS to the circuit SQ by applying D.-C. potentials to selected leads of cable A. Circuit SQ directs each odd and even order digit signal over the leads of cables B and C to the odd and even digit register circuits OR and ER respectively.

When the first digit of a number is passed from source NS over cable A, circuit SQ directs it over cable B to the register OR for storage and then informs the comparator circuit C1 over the check odd digit lead C0 to check the validity of the stored digit. After the digit is stored, it is sent to the comparator C1 and to the odd digit gate OG. Comparator C1 compares the received odd digit with the digit information received from the even register circuit ER to check that digit in accordance with the aforementioned rule.

The check of the first digit always satisfies the rule since information received from circuit ER indicates that a digit is not stored therein when the first digit is checked. After the satisfactory check, the comparator C1 enables the gate circuit OG to pass the first digit over the leads of cable D to the utilization circuit UC.

At the end of the first digit transmission, the D.-C. signals are removed from the leads of cable A. Sequence circuit SQ detects this removal and causes the temporary release of the comparator C1 and, in turn, the gate OG. After the release of the comparator C1, circuit SQ is prepared for directing the second digit from source NS to the even digit register ER. At the same time, circuit SQ is operated to prevent the second digit from being passed to the register OR which is now storing the first digit.

The second digit is transmitted from the source NS over cable A through circuit SQ and over cable C to the register ER for storage. Thereafter, this digit is sent from register ER to the comparator circuit C2 and even digit gate circuit EG. Circuit SQ then activates the comparator C2 over the check even digit lead CE for checking the second digit received from register ER against the first digit received from the register OR to determine the validity of the digits with respect to the rule.

Provided the check satisfies the rule, the comparator C2 signals the gate EG to pass the second digit to the circuit UC. However, if the second digit is greater than the first, the check fails to satisfy the rule and comparator C2 informs the alarm circuit ALM of this condition. Circuit ALM then sends a signal over the transposed digit lead TD to circuit UC to notify it of the invalid digit. In response to the latter signal, circuit UC proceeds to operate circuit SQ over the reset lead RL for resetting the register circuits OR and ER after the D.-C. signals are removed from cable A at the end of the second digit transmission. The latter operation causes the erasure of the first and second digits from the registers OR and ER. Subsequently, when the first and second digits of another number are transmitted from source NS they are checked in the manner described in the foregoing paragraphs.

After a valid second digit has been checked and sent from gate EG to the circuit UC, as previously described, the D.-C. signals are removed from cable A and circuit SQ detects the removal and causes the temporary release of comparator C2 and gate EG. Upon the release of comparator C2, circuit SQ resets the register OR to erase the first digit from that register and then conditions itself for directing the third digit to register OR. Circuit SQ also operates to prevent the third digit from being passed to the register ER which is now storing the second digit.

When the third digit is applied to cable A, it is directed through circuit SQ to the register OR which stores the digit and also passes it to the comparator C1 and gate OG. Comparator C1 is then activated by circuit SQ over lead CO for checking the validity of the third digit against the second digit received from circuit ER. If the check satisfies the rule, comparator C1 enables gate OG to send the third digit to circuit UC.

On the other hand, if the rule is not satisfied, comparator C1 informs circuit ALM that an invalid digit has been detected. Circuit ALM then applies a signal to lead TD to notify circuit UC of the invalid digit. The latter circuit then proceeds to operate circuit SQ over lead RL for effecting the release of registers OR and ER at the end of the third digit transmission from source NS. This last operation erases the stored second and third digits from the registers OR and ER and prepares circuit OR for the receipt of the first digit of another number. The first, second, and third digits of a new number transmitted from the source NS to the circuit SQ are then checked in the manner hereinbefore explained.

Even and odd digits subsequent to a valid third digit may be sent from source NS to the check circuitry and be checked in substantially the same manner as described hereinbefore. For example, the fourth, sixth and eighth digits are checked in substantially the same manner as is the second digit. In a similar fashion, fifth, seventh and ninth digits are checked in the same manner as is the third digit.

In accordance with the exemplary embodiment, circuit UC is designed to receive a predetermined number of digits. It recognizes the receipt of the last digit of this number and is arranged for signaling the circuit SQ over the lead RL to release the activated comparator and gate circuits as soon as the last digit has been transmitted from source NS. When the latter occurs, circuit SQ resets the registers OR and ER to erase the last and the next to the last digits from these registers and prepares for the receipt of the first digit of another number.

DETAILED DESCRIPTION

Figure 2:
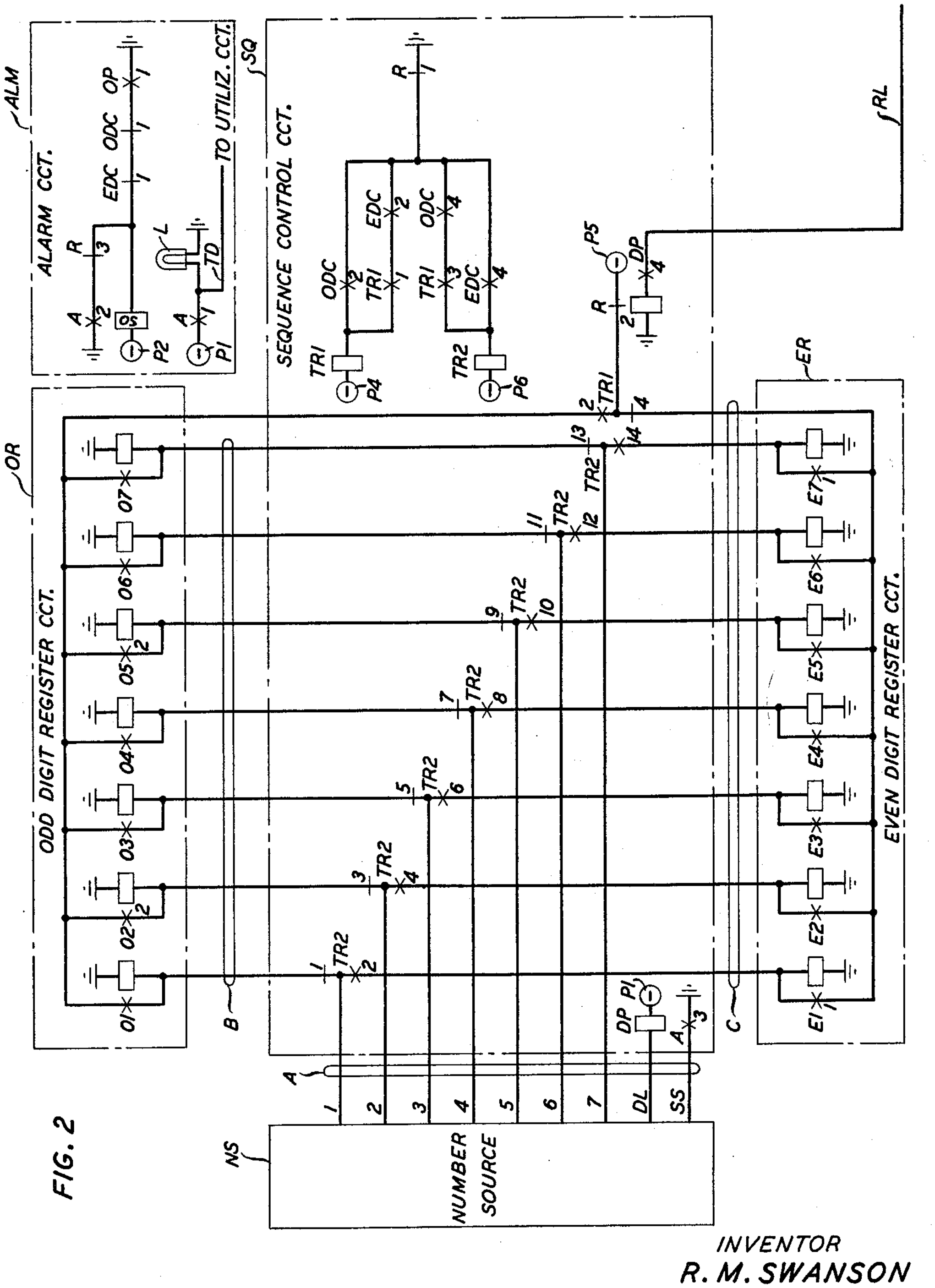
FIG. 2 shows, in block and schematic diagrams, a sequence circuit for interconnecting a number source with odd and even digit register relay circuits, and an alarm circuit.

Each odd and even order digit of a plural order number is sent from source NS of FIG. 2 in the coded form of negative potentials on two out-of-the-seven leads 1 to 7 of cable A. This method of digit transmission is usually referred to as 2 out of 7 code. Valid digits of such a number are transmitted from the checking circuitry to circuit UC of FIG. 3 in the coded form of ground potential on 1 of 20 leads of the cables D and E of FIG. 3. This method is called a 1 out of 20 code.

The sequence of the circuit operations for checking the validity of the digits of a plural order number is initiated when the source NS of FIG. 2 applies to selected leads of cable A the negative potentials representing the first digit. The following Table I indicates the decimal symbol of each digit transmittable from source NS and the leads of cable A to which negative potentials are applied for transmitting these digits.

*Table I*

| Decimal Symbol: | Leads of Cable A |
|---|---|
| 0 | 4,6 |
| 1 | 1,5 |
| 2 | 1,6 |
| 3 | 1,7 |
| 4 | 2,5 |
| 5 | 2,6 |
| 6 | 2,7 |
| 7 | 3,5 |
| 8 | 3,6 |
| 9 | 3,7 |

In the following description, it is assumed that the number supplied by source NS is the three digit number 435. When negative potentials are applied by source NS to the leads 2 and 5, circuits are completed for operating the odd digit register relays O2 and O5 in the register OR and for thereby storing the first odd order digit 4. These circuits extend from the negative potentials in source NS over leads 2 and 5 through the contacts 3 and 9 of the transfer relay TR2 and the windings of relays O2 and O5 to ground potential.

At the same time the negative potentials are applied to leads 2 and 5, ground potential is applied to the digit present lead DL of cable A to complete the circuit through the winding of the digit present relay DP to potential P1 for operating that relay. When relay DP operates, it closes its contact 1 to complete the operate circuit for the alarm relay A of FIG. 2. This circuit is from ground through contact 1 of relay OP, contact 1 of relay ODC, contact 1 of relay EDC and winding of relay A to negative potential P2.

Relay A is a slow acting device which requires its operating circuit to remain closed for a predetermined interval before it operates. During this interval, the digit received from the source NS is checked against the encoding rule as hereinafter described. If the check satisfies the rule, this operate circuit is opened before relay A is operated. On the other hand, if the check fails to satisfy the rule, relay A operates to indicate that an invalid digit has been detected.

Upon the operation of relays DP, O2, and O5, a circuit is completed for operating the odd digit check relay ODC to indicate that the first digit satisfies the encoding rule. This circuit extends from ground through contact 2 of relay DP, contact 15 of the transfer relay TR2; lead CO; contact 1 of relay O2; contact 1 of relay O5; unactuated contacts of even digit register relays E1, E2, E5, E6 and E7; and the winding of relay ODC to negative potential P3.

Contacts of relays in register ER are arranged in the operate circuit for relay ODC so that if the digit stored in the register ER is greater than the digit stored in the register OR the operate circuit for relay circuit ODC can not be completed. None of the latter contacts are actuated at the time that the first digit is stored in register OR. Consequently, relay ODC is operated by the receipt of the first digit to indicate that it satisfies the rule.

Upon operating, relay ODC opens at its contact 1 the previously described operate circuit for relay A of FIG. 2 to prevent that latter relay from operating.

The operation of relay ODC closes its contact 2 to complete the operate circuit for the transfer relay TR1 of FIG. 2. This circuit extends from ground through contact 1 of the release relay R, contact 2 of relay ODC, and the winding of relay TR1 to negative potential P4. Upon operating, relay TR1 closes its contact 1 to complete the locking path for itself through contact 1 of the even digit check relay EDC and contact 1 of relay R to the ground. The operated relay TR1 also actuates its contact 2 to complete the locking paths for relays O2 and O5 in register OR and thereby causes the digit 4 to be retained in that register for a subsequent check of the second digit received from source NS. These locking paths extend from negative potential P4 through contact 2 of relay R, contact 2 of relay TR1, contact 2 of relay O2, and contact 2 of relay O5.

When relay ODC operates, its contact 3 in the odd digit gate circuit OG is actuated to complete a circuit path from ground through contact 3 of relay O2 and contact 3 of relay O5 for sending a digit 4 over the lead 40 to circuit UC.

At the end of the first digit transmission, source NS removes the negative potentials from the leads 2 and 5, and the ground from lead DL. Relays O2 and O5 do not release at this time, however, since they are lock operated as previously stated, on the control of relay TR1. However, relay DP is released to initiate a sequence of operation which prepares the circuits of FIGS. 2 and 3 for the receipt of the second digit. Upon releasing, relay DP opens its contact 2 to effect the release of relay ODC. The release action of relay ODC opens its contact 3 to interrupt the sending of the digit 4 to circuit UC and also recloses its contact 4 to complete an operate circuit for relay TR2. The latter circuit is from ground through contact 1 of relay R, contact 4 of relay ODC, contact 3 of relay TR1, and the winding of relay TR2 to negative potential P6.

Upon operating, relay TR2 opens its contact 15 to disable comparator circuit C1 until after a second digit is checked. Contacts 1 to 14 of relay TR2 are actuated when that relay is operated to open the connections between the relays of the register OR and the leads 1 to 7 and to close connections between these leads and the relays of register ER. The circuits of FIGS. 2 and 3 then await the receipt of the second digit.

The second digit, as previously assumed, is a 3. This digit is sent from source NS by connecting negative potentials to the leads 1 and 7 of the cable A in accordance with Table I. These potentials are extended from leads 1 and 7 through contacts 2 and 14 of relays TR2 to operate the even digit register relays E1 and E7 of FIG. 2 and thereby store the second digit in register ER.

When the second digit is sent over cable A, ground potential is also connected to lead DL to complete the obvious circuit for operating relay DP. Upon operating, relay DP closes, at its contact 2, the previously described operating circuit for relay A of FIG. 2. The operation relay DP closes its contact 3 in comparator circuit C2 to initiate in that circuit the check of the first and second digits. This check is made by contacts of relays E1–7 and O1–7 in comparator C2.

When the check satisfies the aforementioned rule, a path is completed through this contact arrangement for operating the even digit check relays EDC. If the second digit was greater than the first, contacts of relays in register OR would prevent the operation of relay EDC and thereby cause the operation of alarm relay A to indicate the detection of an invalid digit. In accordance with the foregoing assumption, however, first digit 4 is greater than the second digit 3; hence, the rule is satisfied when these digits are checked and consequently relay EDC is operated. The operate circuit for relay EDC is from ground through contact 3 of relay DP, contact 16 of relay TR2, lead CE, contact 1 of relay E1, contact 1 of relay E7, unactuated contacts of relays O1, O4, and O6, and the winding of relay EDC to negative potential P7.

The operation of relay EDC actuates its contact 1 to open the operate circuit for relay A of FIG. 2 and thereby deactivates alarm circuit ALM.

When relay EDC operates, it closes its contact 4 to complete a locking path for relay TR2 and opens at its contact 2 the locking path for relay TR1, thereby causing the latter relay to release.

Upon releasing, relay TR1 completes the path from potential P5 through contact 2 of relay R, contact 4 of relay TR1, contact 1 of relay E1, contact 1 of relay E7 for locking the latter relays operated and thereby retaining the second digit in register ER for a subsequent check with the third digit received from source NS. The release action of relay TR1 also opens at its contact 2 the locking paths for relays O2 and O5 and thereby causes these relays to release. Register OR is then prepared for receiving the third digit.

Upon operating, relay EDC actuates its contact 3 in even digit gate circuit EG to complete a path from ground through contact 3 of relay E1 and contact 3 of relay E7 to lead 3E for sending the digit 3 to circuit UC.

Figure 3:
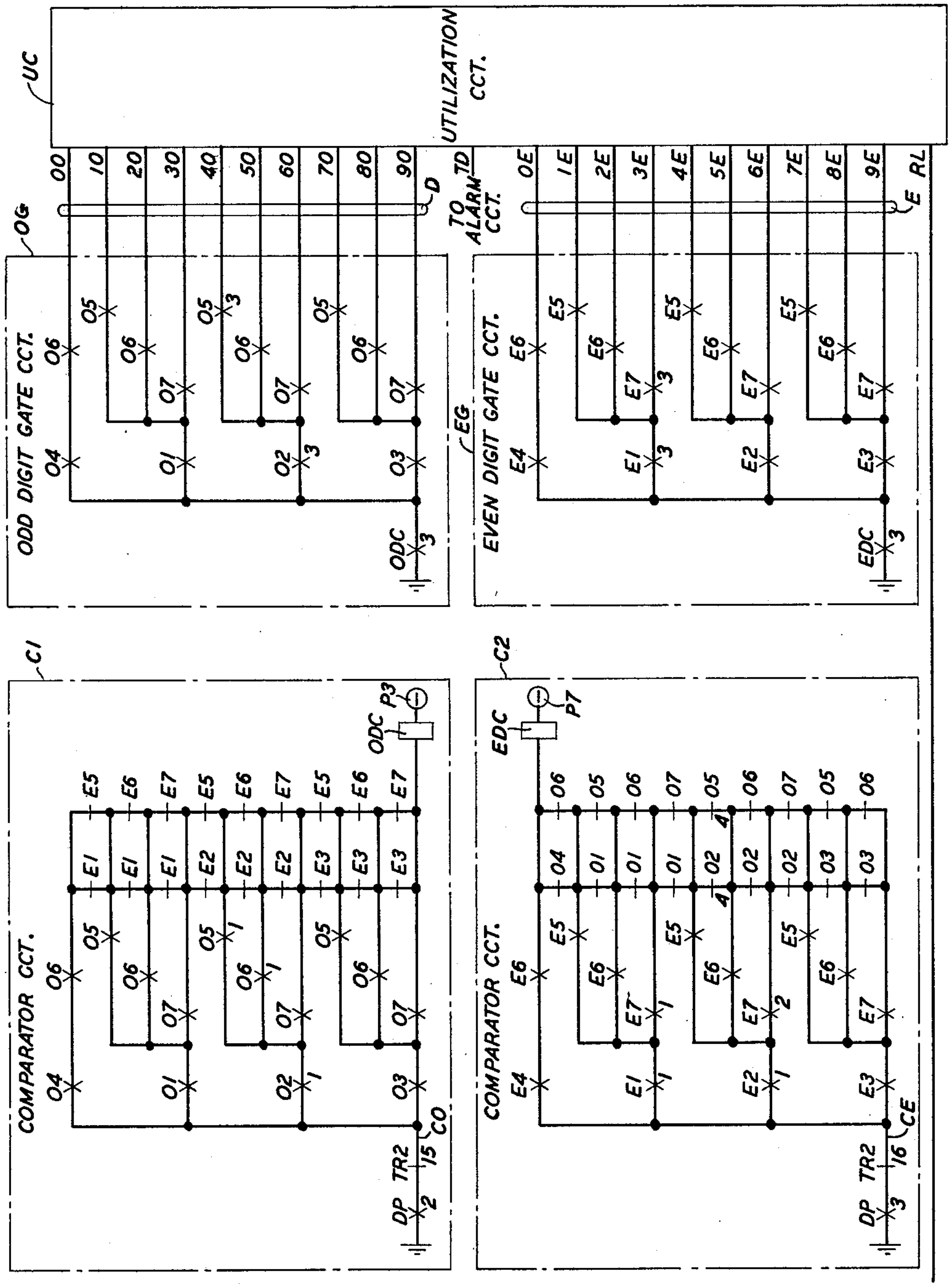
FIG. 3 illustrates checking equipment including comparator circuits and odd and even digit gate circuits.

Before proceeding further with the description of the other operations of the circuits of FIGS. 2 and 3 relative to the number 435, it is advisable at this point to explain the circuit operations that occur when an invalid second digit is sent from source NS. Assume now, for the purpose of illustration, that the first and second digits sent from source NS are 4 and 6, respectively, (even order digit greater than the odd order digit) and that these digits are stored in registers OR and ER respectively. In such a case, relays O2, O5, E2 and E7 of FIG. 2 are operated. When the validity of the second digit is checked following the operation of relay DP, contacts of relays O2 and O5 in comparator C2 prevent the operation of relay EDC. More specifically, it is noted that contact 4 of relay O2 and contact 4 of relay O5 prevent an operate path for relay EDC from being closed from ground through contact 3 of relay DP, contact 16 of relay TR2, contact 1 of relay E2, and contact 2 of relay E7 to the winding of relay EDC. Consequently, when relay EDC is not operated, it permits relay A to operate, as previously explained, after the prescribed delay interval for indicating that the rule has not been satisfied.

Upon operating, relay A connects ground through its contact 3 to the stop sending lead SS to inform source NS that an invalid digit has been detected and that it should prepare for sending the first digit of a new number. When relay A operates, it also closes its contact 1 to complete the obvious circuit for lighting lamp L and thereby supplying a visible indication that the rule has not been satisfied. The actuation of contact 1 also connects negative potential P8 to the transposed digit lead TD for notifying circuit UC that an invalid digit has been detected. Apparatus (not shown) in circuit UC is operated in response to this signal for applying a negative potential to the reset lead RL to complete the obvious circuit through contact 4 of relay DP for operating the reset relay R and then by initiating a sequence of operations which returns the circuits of FIGS. 2 and 3 to the condition in which they rested prior to the receipt of the first digit.

Upon operating, relay R causes its contact 2 to open the paths holding the relays O2 and O5 operated and to cause these relays to release. When operated, relay R also causes its contact 3 to establish a locking path for relay A. Contact 1 of relay R also opens the locking path for relay TR1 and causes that relay to release. Upon releasing, relay TR1 actuates its contacts 1 through 14 and thereby causes the negative potentials on leads 2 and 7 to be transferred from the windings of relays E2 and E7 to the windings of relays O2 and O7. As a result, relays E2 and E7 release and relays O2 and O7 are operated temporarily. The operation for the latter relays, however, performs no function at this time. No other circuit operations occur thereafter until the potentials are removed from the leads of cable A at the end of the second digit transmission.

Relays O2 and O7 release when the negative potentials are removed from the leads 2 and 7, and the circuit OR is then prepared to receive the first digit of a new number. At the same time that these relays are releasing, ground is removed from the lead DL to release relay DP. After relay DP releases, its contact 4 opens the operate circuit for relay R and that relay releases. Relay R upon releasing opens its contact 3 in the holding path of relay A and causes that relay to release and in turn to open its contact 1 for deactivating lamp L and for notifying circuit UC to prepare for the receipt of the first digit of a new number. The release of relay A also opens its contact 3 to disconnect ground from lead SS as a signal to source NS to proceed to send the first digit of a new number. When that digit is received, it is processed through the check circuitry of FIGS. 2 and 3 in the manner as described in the foregoing paragraphs.

Returning now to the previous description relative to the number 435, it is noted that shortly after the digit 3 has been sent to circuit UC, as previously explained ground is removed from lead DL to cause the release of relay DP. Relay DP releases and opens its contact 3 to causes the release of relay EDC. The release action of relay EDC opens its contact 3 in gate EG to interrupt the sending of a digit 3 to circuit UC. Relay EDC also opens its contact 4 to cause the release of relay TR2, which in turn actuates its contacts 1 to 14 to disconnect the leads 1 to 7 from relays E1 to E7 and to connect them to relays O1 to O7.

According to the foregoing assumption, the third digit sent from source NS is a 5. This digit is sent by negative potentials on the leads 2 and 6. These potentials are extended from leads 2 and 6 through contacts 3 and 11 of relay TR2 to the winding of relays O2 and O6 to operate these relays and thereby store the digit 5. At the same time that the digit 5 is being stored, relay DP is operated by ground potential applied in source NS to lead DL. Upon operating, relay DP actuates its contact 2 for signaling comparator C1 to check the second and third digits against the rule.

As previously indicated, contacts of relays O1 to O7 and E1 to E7 in comparator C1 are arranged to perform this check. If the rule is not satisfied, these contacts prevent the operation of relay ODC and cause the alarm circuit ALM to be operated, as hereinbefore explained, for resetting the circuits of FIGS. 2 and 3 and preparing them for the receipt of the first digit of a new number.

When the second digit is not greater than the third digit, as in the present example, relay ODC is operated. Relay ODC operates in the circuit extending from ground through contact 2 of relay DP, contact 15 of relay TR2, contact 1 of relay O2, contact 1 of relay O6, unactuated contacts of relays O3, O5 and O7, and the winding of relay ODC to potential P3.

Following the operation of relay ODC, contact 2 of that relay completes the previously described path for operating relay TR1. Upon operating, relay TR1 closes at its contact 2 the hereinbefore explained locking paths for relay O2 and O6. When relay ODC operates, the digit 5 is sent from gate OG to circuit UC by passing ground through contact 3 of relay ODC, contact 3 of relay O2, contact 3 of relay O6 to lead 50. Circuit UC recognizes the receipt of the last digit, as hereinbefore mentioned, and applies negative potential to lead RL for completing the operate circuit for relay R.

Upon operating, relay R opens its contact 1 to effect the release of relay TR1, which in turn reopens the locking paths for relays O2 and O6. The latter relays do not release at that time, however, because negative potentials are still connected to leads 2 and 6. These potentials are removed from these leads at the end of the third digit transmission and then cause the release of relays O2 and O6. At the same time, ground is removed from lead DL to cause the release of relay DP. Upon releasing, relay DP opens its contact 1 to effect the release of relay ODC which in turn opens its contact 3 in gate OG to interrupt the transmission of the digit 5 to circuit UC. When relay DP releases, it also opens its contact 4 to cause the release of relay R and thereby returns the circuits in FIGS. 2 and 3 to the condition in which they rested prior to the receipt of the first digit.

The check circuitry in FIGS. 2 and 3 has the capacity to compare *n* successive digits without the addition of any apparatus thereto. Successive odd and even order digits subsequent to the third may be sent from source NS and be checked in essentially the same manner described hereinbefore. For example, the fourth, sixth and other even order digits are checked in substantially the same manner as the second digit. The fifth, seventh and other odd order digits are checked in the same manner as the third digit. To compare such a series of digits, however, it is necessary, in accordance with the exemplary embodiment, to adapt circuit UC for recognizing the receipt of the last digit in the series so that it can effect the restoration of the check circuitry to its idle condition.

The checking circuitry may also be adapted to check the validity of numbers of coding systems wherein the valid numbers have the odd order digits not greater than the adjacent even order digits. To obtain this result, modifications are required in circuit SQ and in comparators C1 and C2. The modification in circuit SQ requires the interchange of the make and break contacts of relay TR2 which are associated with the leads of 1 to 7 to allow each odd order digit to be directed to the register ER instead of the register OR and each even order digit to be directed to the register OR instead of the register ER. Modifications in the comparators C1 and C2 require that the contact 15 of relay TR2 be changed to a make contact and contact 16 of relay TR2 be changed to a break contact to enable comparator C1 to check the validity of each even order digit of a received number and comparator C2 to check the validity of each odd order digit of that number. In accordance with such an arrangement, it is noted that gate OG will pass the even order digits to circuit UC and gate EG will pass the odd order digit to circuit UC. The other circuit operations involved in checking the magnitude of the odd and even order digits are essentially the same as described in the preceding paragraphs.

It is to be understood that the hereinbefore described arrangements are illustrative of the application of the principles of the invention. In light of this teaching, it is apparent that numerous other arrangements may be devised by those skilled in the art without departing from the spirit and scope of the invention.

What is claimed is:

1. Checking equipment comprising means for sequentially receiving elements of coded information characters, a pair of relay registers, a sequence circuit having relays for sequentially directing received odd order elements to one of said relay registers and received even order elements to the other relay register, means controlled by said register relays for comparing the registered odd and even order elements, and means operative upon the completion of the comparison for indicating the validity of the compared elements.

2. Checking equipment according to claim 1 wherein said register relays have a plurality of contacts, and said comparing means includes a relay circuit for comparing each odd order element with the immediately preceding even order element, said relay circuit comprising a check relay and a plurality of distinct operate paths for said check relay, each of said paths including contacts of said register relays.

3. Checking equipment according to claim 2 wherein said comparing means further includes a relay circuit for comparing each even order digit with the immediately preceding odd order digit, said last-mentioned circuit comprising a check relay device and a plurality of distinct operate paths for said device including contacts of said register relays.

4. Checking equipment according to claim 3 wherein said directing relays have a plurality of contacts, and each of said operate paths for said check relays include a contact of said directing relays for cooperating with said register relay contacts to sequentially operate said check relays.

5. Checking equipment according to claim 3 wherein said check relays have a plurality of contacts, and said indicating means comprises a plurality of distinct signal paths, each of said signal paths including a contact of said check relays and contacts of said register relays.

6. Checking equipment according to claim 3 further comprising an alarm circuit having an alarm relay and a path including contacts of said check relays for operating said alarm relay to indicate a transposed element in a checked character.

7. A relay checking circuit comprising a source of coded information characters, each of said characters including a plurality of digits, an odd digit register, an even digit register, each of said registers including register relays, a first comparator circuit including a coded array of normally open contacts of said odd digit register relays and normally closed contacts of said even digit register relays, a second comparator circuit including a coded array of normally closed contacts of said odd digit register relays and normally open contacts of said even digit register relays, and sequence circuit means for alternately directing character digits from said source to said digit registers and for alternately energizing said comparator circuits.

8. A relay checking circuit in accordance with claim 7 wherein said sequence circuit means includes a pair of relays and further comprising means including one of said pair of relays for maintaining a character digit stored in one of said registers while a succeeding character digit is being stored in the other of said registers and checked by one of said comparator circuits.

No references cited.